United States Patent [19]

Napier

[11] Patent Number: 5,109,930
[45] Date of Patent: May 5, 1992

[54] EARTH SPLITTER

[76] Inventor: Dennis K. Napier, 6057 Dayburst Way, Sacramento, Calif. 95823

[21] Appl. No.: 565,955

[22] Filed: Aug. 10, 1990

[51] Int. Cl.$^5$ .......................... A01B 1/00; A01G 3/06
[52] U.S. Cl. ...................... 172/13; 172/371; 294/49; 111/99
[58] Field of Search .................. 172/13, 18, 371, 381, 172/611; 111/7.1, 99, 115; 30/277; 294/49, 57, 60; D8/7, 10, 11

[56] References Cited

U.S. PATENT DOCUMENTS

| 84,797 | 12/1868 | Connolly | 294/49 |
|---|---|---|---|
| 212,953 | 3/1879 | Kreider | 294/49 |
| D. 293,412 | 12/1987 | Gonzales | D8/10 |
| 385,324 | 6/1888 | Seller | 111/99 |
| 678,373 | 7/1901 | Blaser | 294/60 X |
| 1,323,630 | 12/1919 | Hall . | |
| 1,757,925 | 5/1930 | Kirkpatrick | 294/49 |
| 2,207,741 | 7/1940 | Kimble | 111/99 |
| 2,210,440 | 8/1940 | Avary | 294/57 X |
| 2,228,275 | 1/1941 | Lawrence | 294/57 |
| 2,704,036 | 3/1955 | Briggs | 294/49 X |
| 3,838,739 | 10/1974 | Pollard | 172/21 |
| 4,466,188 | 8/1984 | Svendsgaard | 30/277 X |

FOREIGN PATENT DOCUMENTS

| 129209 | 4/1946 | Australia | 294/49 |
|---|---|---|---|
| 606094 | 10/1960 | Canada | 294/57 |
| 128874 | 6/1950 | Sweden . | |

Primary Examiner—Randolph A. Reese
Assistant Examiner—Jeffrey L. Thompson
Attorney, Agent, or Firm—Joseph E. Gerber

[57] ABSTRACT

An earth splitting tool comprised of a central shaft, a handle bar, a foot pressure bar and a wedge-shaped blade is disclosed. The blade has two primary trapezoid-shaped faces, two triangular side faces and a rectangular butt face. One primary face in the same plane as a tangent to the surface of the central shaft. The butt face has a width substantially the same as the thickness of the central shaft. The butt face may be perpendicular to the axis of the central shaft, or it may be sloped away from the perpendicular. The length of the butt face may also be substantially the same as the thickness of the central shaft.

6 Claims, 2 Drawing Sheets

EARTH SPLITTER

BACKGROUND OF THE INVENTION

1. Field Of The Invention

The present invention relates generally to tools for splitting earth, and more specifically to a wedge driven by hand and foot power.

2. Description Of The Related Art

A wide variety of construction and cultivating tasks require that a neat furrow be cut several inches into the earth. For example, shallow undersurface conduits such as sprinkler lines, and outdoor electrical wiring, need to be sufficiently buried for protection and to meet local building codes. Unfortunately, it is often difficult to cut a neat furrow, especially when compacted soils, dried clay, hard-pan and the like prevent conventional hand tools from penetrating sufficiently. For example, when a pick or grubbing hoe is swung against hard earth it tends either to bounce off or to penetrate only slightly. Repeated swings may force compacted earth to yield, although it is difficult to cut a precise furrow in this manner even in loose soils.

Shovels and spades of many designs may also be employed, although even when urged against the earth's surface with foot pressure, some soils continue not to yield. And, shovels and spades tend only to make a thin slice in the earth; to make a furrow of substantial width, they need to be rocked to and fro.

Various earth piercing devices ar found in the patent literature, one example of these being shown in U.S. Pat. No. 3,838,739 issued to Pollard in 1974. Pollrd's device includes a handle bar and a foot pressure bar, although it is adapted merely to punching smalll, circular holes in the earth. Another such device is shown in U.S. Pat. No. 1,323,630 issued to Hall in 1919, Hall's device having a loop-shaped handle. Hall employs a foot rest for pressure from a single foot and, like Pollard, punches small, circular holes. Unfortunately, it is cumbersom and inefficient to attempt to align circular holes to create a neat furrow.

U.S. Pat. No. 1,757,925 issued to Kirkpatrick in 1930 shows a device having interchangeable earth piercing tips. One of Kirkpatrick's tips is a cone for making circular holes, as above. The other is a blade shaped as a thin, rectangular wedge able to make a slice in the earth the length and thickness of the blade. However, in order to make a furrow of substantial width using the blade, the handle of Kirkpatrick's device must be rocked to and fro to widen the slice in the earth. Further, as Kirkpatrick's blade is narrower than his handle, the blade of his tool cannot be placed flush against the side of a solid object and driven directly downward. For example, if used close against the edge of a cement walk, the ridge above the blade will catch as the tool begins to sink into the earth.

Swedish Patent No. 128,874 shows a combination tool having a rake-like hoe at one end of an elongate handle and an earth piercing tip at the other. This device also includes a foot pressure bar adjacent its earth piercing tip. The tip is triangular in cross-section, and has its broadest face in the same plane as the surface of its handle, permitting work next to solid objects. However, when driven into the earth, the device of the Swedish Patent will merely punch triangular holes; it will not divide the earth such that repeated, laterally-aligned strokes create a neat furrow.

Thus, it appears that a need exists for a hand tool able to cut a neat furrow of substantial width, even in compacted soils. Further, it is desirable that the tool be useable up against solid bariers such as walls, and the like.

SUMMARY OF THE INVENTION

The earth splitting tool of the present invention is adapted to overcome the above-noted shortcomings of prior devices and to address the above-stated needs. It includes an elongate, rigid central shaft with an integral handle bar bisected by, and disposed perpendicular to, the central shaft at the shaft's upper end. An integral foot pressure bar is bisected by, and perpendicular to, the shaft at its lower end. A blade is disposed coaxial with the shaft at its lower end, the blade being shaped as a wedge having two quadrangular faces and two triangular side faces. The fifth face, the butt of the wedge, is also quadrangular and is integrally mated with the central shaft's lower end. The fifth face, further, has a width substantially the same as the thickness of said shaft. The quadrangular faces have common lower peripheries which define a cutting edge.

Alternative embodiments of the invention are presented as well, these being directed to limiting buildup of debris atop the fifth face.

It is an object of the present invention to provide an efficient earth splitting tool which is simple to operate and able to produce a neat furrow, even in compacted soil.

It is a feature of the tool of the present invention that the entire body weight of the tool operator may be placed over the tool's blade to aid in driving it straight downward.

It is an advantage of the tool of the present invention that its wedge-shaped blade is able to create a neat, substantial furrow when the tool is driven straight downward.

It is a further advantage of the tool of the present invention that it need not be rocked to and fro to produce a neat furrow of substantial width.

Yet another advantage of the tool of the present invention is that it may be placed flush against a solid vertical barrier and driven downward, as well as pulled upward, without catching on the barrier.

And, it is an advantage of alternative embodiments of the present invention that they limit or eliminate buildup of unwanted dirt and debris on the tool.

Still further objects, features and advantages of the inventive earth splitting tool disclosed herein will be apparent from the drawings and following detailed description thereof.

DESCRIPTION OF THE PREFERRED EMBODIMENTS

Figure 1:
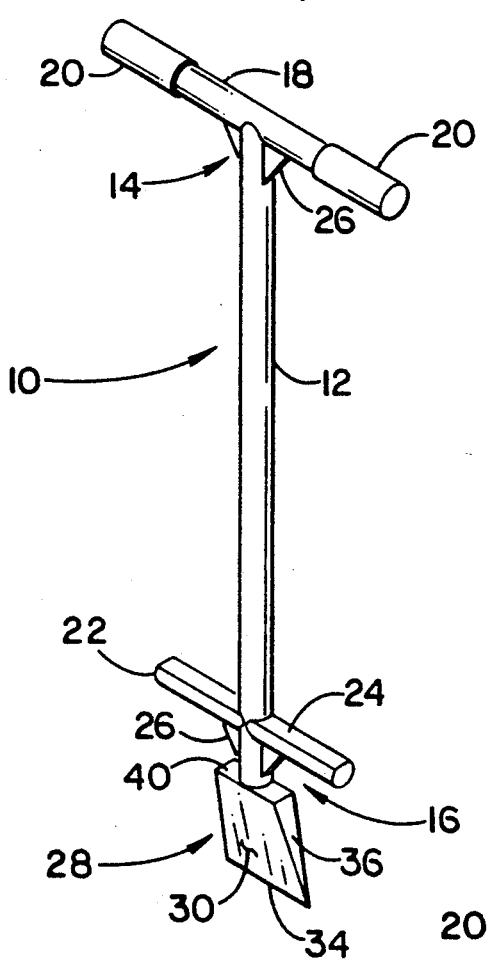
FIG. 1 is a perspective view of one embodiment of the earth splitting tool of the present invention.
Figure 2:
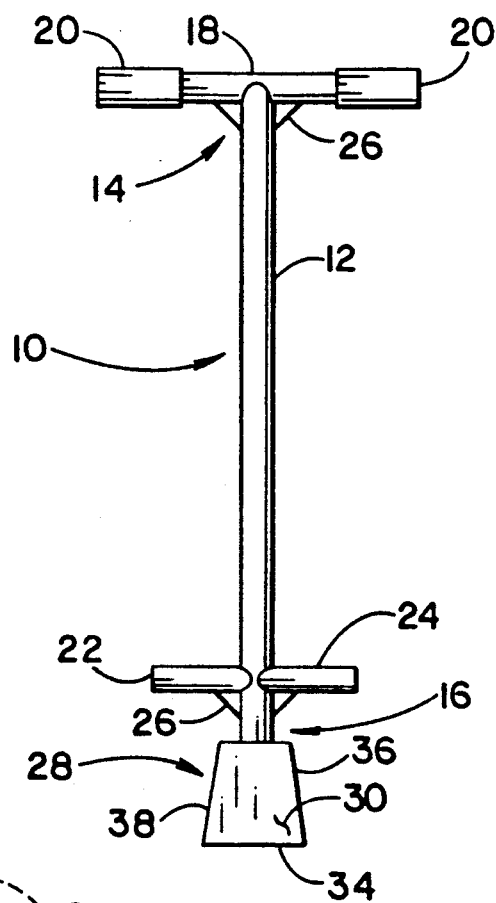
FIG. 2 is a front elevation of the tool of FIG. 1.
Figure 3:
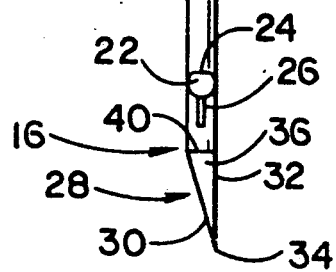
FIG. 3 is a side elevation of the tool of FIG. 1.

Referring now specifically to the drawings, FIGS. 1, 2 and 3 show a first embodiment of the earth splitting tool of the present invention generally designated herein with reference numeral 10. Tool 10 includes a rigid, elongate central shaft 12 which, in its orientation for normal use, has an upper end 14 and a lower end 16. A rigid handle bar 18 is bound integral with shaft 12's upper end such that handle bar 18's length is bisected at the point where shaft 12 is bound. Handle bar 18 is oriented perpendicular to shaft 12.

Handle bar 18 also preferably includes a pair of hand grips 20 at its ends, these being expected to permit increased comfort and control in use of tool 10.

Tool 10 also includes a rigid foot pressure bar 20 integrally bound to shaft 12 adjacent its lower end such that foot pressure bar 22's length is bisected by shaft 12. Foot pressure bar 22, like handle bar 18, is oriented perpendicular to shaft 12. And, handle bar 18 and foot pressure bar 22 reside in the same plane.

Foot pressure bar 22 also preferably includes flattened upper surfaces 24 as best shown in FIGS. 1 and 3. Flattened surfaces 24 are expected to reduce the likelihood of the tool operator's foot slipping while applying pressure to foot pressure bar 22.

Central shaft 12, and bars 18 and 22 are preferably of stock that is circular in cross-section, i.e. cylindrical. However, rectangular stock, or stock of another configuration may also work as well.

Triangular reinforcing webs 26 are provided on opposite sides of central shaft 12, spanning the right angles between shaft 12 and the underside of handle bar 18. Like webs 26 are provided beneath foot pressure bar 22. Each web 26 is integrally bound to the bar it supports, as well as to shaft 12.

Wedge-shaped blade 28 is integrally bound to the lower end 16 of central shaft 12 in the first embodiment of tool 10. As shown in FIGS. 1, 2 and 3, blade 28 has two large primary faces, one being the front face and the other being the rear face. The front and rear faces are identified by reference numerals 30 and 32, respectively. Faces 30 and 32 are quadrangular; specifically, they are isosceles trapezoids. Faces 30 and 32 are set on an angle to one another, having common lower peripheries which define a cutting edge 34. Blade 28 also has two side faces numbered 36 and 38, respectively. Faces 36 and 38 are right triangles, each being a mirror image of the other.

The "butt" of wedge-shaped blade 28 is a quadrangular face, numbered 40. Butt face 40 is rectangular in the instant embodiment of the invention, and oriented perpendicular to the axis of central shaft 12. The width of face 40, i.e. the distance between the upper edges of front face 30 and rear face 32, is substantially the same as the thickness of central shaft 12.

As faces 36 and 38 are right triangles, rear face 32 is necessarily set at a right angle with respect to butt face 40. And, as shown in FIG. 3, blade 28 is oriented so that its rear face 32 is aligned with the surface of central shaft 12. That is, face 32 is in the same plane as a tangent to the surface of central shaft 12. Further, face 32 is in a plane parallel to that within which handle bar 18 and foot pressure bar 22 reside.

As noted above, the width of face 40 is substantially the same as the thickness of central shaft 12. Thus, no ridge exists between front face 32's upper edge and the surface of central shaft 12. A smooth, unbroken surface is provided between shaft 12 and face 32 to prevent the tool from catching when driven downward or pulled upward next to solid objects. Front face 30 also meets shaft 12 such that a minimal likelihood of catching exists if face 30 is against a solid object when tool 10 is being driven downward or pulled upward.

Figure 5:
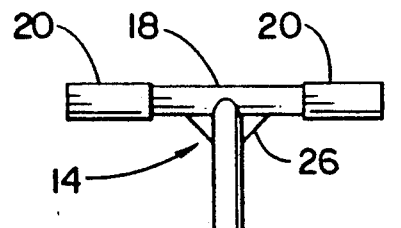
FIG. 5 is a front elevation of the tool of FIG. 4.
Figure 4:
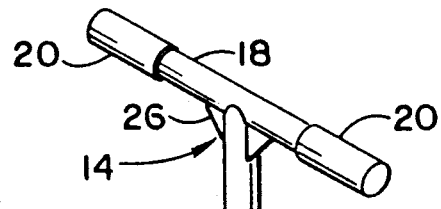
FIG. 4 is a perspective view of an alternative embodiment of the earth splitting tool of the present invention.
Figure 6:
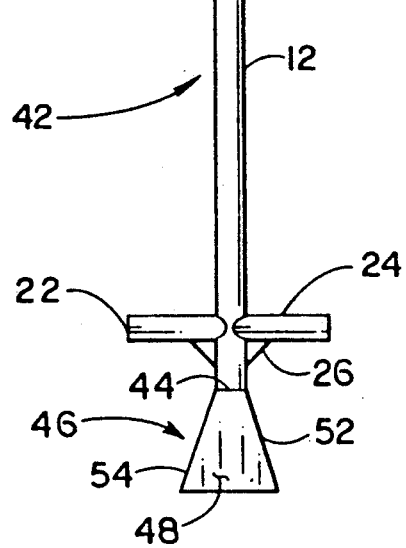
FIG. 6 is a side elevation of the tool of FIG. 4.
Figure 6:
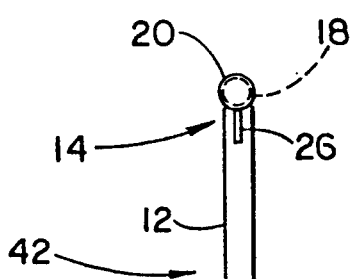

An alternative embodiment of the inventive earth splitting tool is shown in FIGS. 4, 5 and 6, this embodiment generally being designated herein with reference numeral 42. Tool 42 has a modified blade 44 with a reduced-sized butt face 46, the length and width of which closely approximate the thickness of central shaft 12. Accordingly, trapezoidal front and rear faces 48 and 50, of modified shape and dimension, are employed in this embodiment. Specifically, they are narrowed at their upper extremes so that the length of their upper edges closely approximates the thickness of central shaft 12. Nevertheless, they continue to be isosceles trapezoids.

Modified triangular side faces 52 and 54 are slightly longer than their first-embodiment counterparts, 36 and 38. Further, they have an angle of lesser magnitude where they meet the cutting edge of blade 44, and they include a somewhat greater angle between butt face 46 and front face 48.

Alternative embodiment 42 is given the above-described configuration so that soil and other debris is unable to rest on top of blade 44. That is, butt face 46 is so close in size to the cross-sectional area of central shaft 12 that very little, if any, horizontal surface remains exposed for debris to pile upon. In order to further minimize this horizontal surface area, the central shaft of tool 42 may be constructed of rectangular stock of the same cross-sectional shape and dimensions as butt face 46. Or, instead of the butt face being rectangular, the blade may be constructed so that the butt face is circular in shape and sized to match the diameter of a cylindrical central shaft. Of course, in these instances, the butt face would not be prominently identifiable; the shape of the blade would simply blend into the shape of the lower end of the central shaft.

Figure 7:
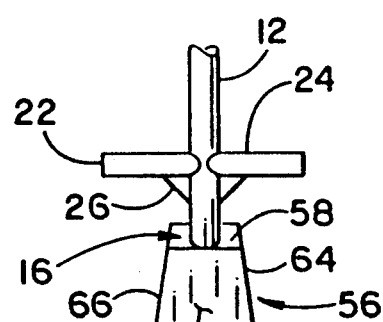
FIG. 7 is an enlarged side elevation of the blade of a second alternative embodiment of the inventive earth splitting tool.
Figure 8:
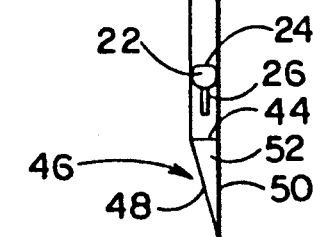
FIG. 8 is an enlarged front elevation of the alternative blade of FIG. 7.

As shown in FIGS. 7 and 8, a second alternative modification of the blade, numbered 56, may also achieve the result of preventing buildup of debris on top of the blade. Therein, alternative butt face 58 is shown to be sloped. That is, face 58 is non-horizontal; it is sloped away from a perpendicular relation with the axis of the central shaft. A 45° angle is expected to work well for shedding debris. Thus, in this embodiment, front face 60 is somewhat reduced in its dimension between its lower cutting-edge periphery and its upper butt face-adjoining periphery. Further, in this embodiment, front face 60 is disposed at an obtuse angle with respect to butt face 58, and rear face 62 is disposed at an acute angle with respect thereto. This makes the side faces of this second embodiment, numbered 64 and 66, scalene triangles.

As, in any of the inventive tool's embodiments, the width of the butt face should be of the same dimension as the thickness of the central shaft, the width of any furrow cut will correspond to the width of the butt face and the shaft. Thus, the purpose to which a particular version of the tool will be directed will determine the width of the butt face of its blade and the thickness of its central shaft. For example, a version of the tool suited to cutting a narrow furrow for electrical wire only needs a butt face, and a blade thickness, of minimal dimension. An inch, or two, may suffice. In contrast, a furrow of sufficient width to receive a sprinkler water line may require a blade with a butt face three to four inches in thickness. Accordingly, the central shaft of such a version of the tool will be correspondingly thicker.

It should be noted that there is a relationship between the thickness of the central shaft and blade, and the width of the desired furrow. Narrow furrows cut with a narrow blade require a relatively small amount of downward pressure on the tool. Wide furrows cut with wide blades require more pressure. Therefore, it is preferred that all embodiments of the tool be constructed of solid stock, iron or steel being expected to work best. The utilization of solid ferrous stock is expected to permit any version of the tool to penetrate earth sufficiently when dropped from a comfortable height and driven downward by its own mass. However, it is also possible that hollow stock may e employed, if such stock has walls sufficiently thick to give the tool enough mass to work as desired.

Hollow metallic stock filled with a dense material may also suffice to produce the desired relationship between the tool's mass and the furrow it is dimensioned to cut.

The inventive tool may be fashioned in any conventional manner as by being molded, forged from a single piece of stock or bolted together. However, it is important that it be rigid and of integral construction. Further, the cutting edge of the blade should be hardened and sharpened as by grinding.

It is expected that a tool, as described, with an overall, approximate length of 5.5 feet will work adequately and be comfortable to operate. Further, the handle bar may be about 2 feet in length, and the foot pressure bar may be about 1.5 feet in length. It is expected that placement of the foot pressure bar approximately 1 foot above the blade's cutting edge will work well, and that a cutting edge length of 4 inches, or so, is sufficient. In any case, the length of the cutting edge should be substantially greater than the thickness of the central shaft.

In use, the tool of the present invention in easy to operate. The operator merely raises the tool above the earth a comfortable distance and lets it drop where the beginning of a furrow is desired. If the tool does not penetrate to the depth desired, it may be raised and dropped again. Otherwise, the operator may urge it downward with hand and foot pressure. If necessary, the operator may fully stand upon the foot pressure bar, balancing with the aid of both hands gripped to the handle bar, and bounce up and down on the tool to urge it further downward. Once the desired depth is reached, the tool is simply withdrawn from the earth and moved laterally by a distance equivalent to the dimension of the tool's cutting edge. Then, the above-described process is repeated as necessary to yield the length of furrow desired.

If working next to a solid barrier such as the edge of a cement walk, or the like, the operator needs merely to set the lower periphery of the blade's rear face flush against the barrier with its cutting edge touching the earth where the intended furrow is to begin. Upon the operator's application of downward pressure, the tool will travel downward past the barrier without catching upon it.

The foregoing detailed disclosure of the inventive earth splitting tool is considered as only illustrative of the preferred embodiment of, and not a limitation upon the scope of, the invention. Those skilled in the art will envision many other possible variations of the structure disclosed herein that nevertheless fall within the scope of the following claims. For example, the butt face of the blade may be shaped to match the shape of the central shaft's circular cross-section, or the cross-section of the central shaft may be rectangular and of the same dimensions as the butt face. And, alternative uses for this inventive tool may later be realized. Accordingly, the scope of the invention should be determined with reference to the appended claims, and not by the examples which have herein been given.

I claim:

1. A hand and foot-powered earth splitting tool, comprising:
   a. An elongate, rigid central shaft having upper and lower ends;
   b. A handle bar integral with and perpendicular to said central shaft at said central shaft's upper end, said central shaft bisecting the length of said handle bar;
   c. A foot pressure bar integral with and perpendicular to said central shaft near said central shaft's lower end, said central shaft bisecting the length of said foot pressure bar, said foot pressure bar, further, residing in the same plane as said handle bar; and,
   d. A blade disposed at said central shaft's slower end, said blade being shaped as a wedge having first and second quadrangular primary faces, third and fourth triangular side faces, and a fifth butt face integrally mated with said central shaft's lower end and sloped away from a perpendicular relation with the axis of said central shaft, and having a width substantially the same as the thickness of said central shaft, said first and second primary faces having common lower peripheries defining a cutting edge.

2. A hand and foot-powered earth splitting tool, comprising:
   a. an elongate, rigid central shaft having upper and lower ends;
   b. a handle bar integral with and perpendicular to said central shaft at said central shaft's upper end, said central shaft bisecting the length of said handle bar;
   c. a foot pressure bar integral with and perpendicular to said central shaft near said central shaft's lower end, said central shaft bisecting the length of said foot pressure bar, said foot pressure bar, further, resisting in the same plane as said handle bar; and,
   d. a blade disposed at said central shaft's lower end, said blade being shaped as a wedge having first and second quadrangular primary faces, third and fourth triangular side faces, and a fifth quadrangular butt face integrally mated with said central shaft's lower end and having at width substantially the same as the thickness of said central shaft, wherein one of said primary faces of said blade is disposed at a right angle to said butt face, and wherein the other of said primary faces is disposed at an acute angle to said butt face, said primary faces having common lower peripheries defining a cutting edge.

3. The earth splitting tool of claim 2, wherein said primary face disposed at a right angle to said butt face is also disposed in the same plane as a tangent to the surface of said central shaft.

4. A hand and foot-powered earth splitting tool, comprising:

a. an elongate, rigid central shaft having upper and lower ends;
b. a handle ba integral with and perpendicular to said central shaft at said central shaft's upper end, said central shaft bisecting the length of said handle bar;
c. a foot pressure bar integral with and perpendicular to said central shaft near said central shaft's lower end, said central shaft bisecting the length of said foot pressure bar, said foot pressure bar, further, residing in the same plane as said handle bar; and,
d. a blade disposed at said central shaft's lower end, said blade being shaped as a wedge having first and second quadrangular primary faces, third and fourth triangular side faces, and a fifth quadrangular but face integrally mated with said central shaft's lower end and having a width substantially the same as the thickness of said central shaft, wherein one of said primary faces of aid blade is disposed at an acute angle to said butt face and the other of said primary faces is disposed at an obtuse angle to said butt face, and wherein said acutely angled face is also disposed in eh same plane as a tangent to the surface of said central shaft, said primary faces having common lower peripheries defining a cutting edge.

5. A hand and foot-powered earth splitting tool, comprising:
a. an elongate, rigid central shaft having upper and lower ends;
b. a handle bar integral with and perpendicular to said central shaft at said central shaft's upper end, said central shaft bisecting the length of said handle bar;
c. a foot pressure bar integral with and perpendicular to said central shaft near said central shaft's lower end, said central shaft bisecting the length of said foot pressure bar, said foot pressure bar, further, residing in the same plane as said handle bar; and,
d. a blade disposed at said central shaft's lower end, said blade being shaped as a edge having first and second quadrangular primary faces, third and fourth triangular side faces, and a fifth quadrangular butt face integrally mated with said central shaft's lower end and having a width substantially the same as the thickness of said central shaft, wherein said third and fourth triangular side faces are shaped as right triangles, and wherein said primary faces have common lower peripheries defining a cutting edge.

6. A hand and foot-powered earth splitting tool, comprising:
a. an elongate, rigid central shaft having upper and lower ends;
b. a handle bar integral with sand perpendicular to said central shaft at said central shaft's upper end, said central shaft bisecting the length of said handle bar;
c. a foot pressure bar integral with and perpendicular to said central shaft near said central shaft's lower end, said central shaft bisecting the length of said foot pressure bar, said foot pressure bar, further, residing in the same plane as said handle bar; and,
d. a blade disposed at said central shaft's lower end, said blade being shaped as a wedge having first and second quadrangular primary faces, third and fourth triangular side faces, and a fifth quadrangular butt face integrally mated with said central shaft's lower end and having a width substantially the same as the thickness of said central shaft, wherein said fist and second primary faces are isosceles trapezoids and said third and fourth side faces are right traingles, and wherein said butt face is bound to said central shaft in perpendicular relation to aid shaft's axis, said primary faces having common lower peripheries defining a cutting edge.

* * * * *